US008279307B2

(12) United States Patent
Lin et al.

(10) Patent No.: US 8,279,307 B2
(45) Date of Patent: Oct. 2, 2012

(54) SHARPNESS PROCESSING METHOD AND SYSTEM FOR DIGITAL IMAGE

(75) Inventors: Che-Hung Lin, Nantou County (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 411 days.

(21) Appl. No.: 12/709,758

(22) Filed: Feb. 22, 2010

(65) Prior Publication Data

US 2010/0321524 A1     Dec. 23, 2010

(30) Foreign Application Priority Data

Jun. 17, 2009    (TW) .............................. 98120315 A (51) Int. Cl.
     *H04N 5/208*      (2006.01)
(52) U.S. Cl. ...................................................... 348/252
(58) Field of Classification Search ................... 348/252
See application file for complete search history.

(56) References Cited

U.S. PATENT DOCUMENTS

| | | | | |
|---|---|---|---|---|
| 7,999,867 B2 * | 8/2011 | Noh | ............................... | 348/252 |
| 2008/0297648 A1 * | 12/2008 | Furuki et al. | ................... | 348/345 |
| 2009/0167923 A1 * | 7/2009 | Safaee-Rad et al. | ........... | 348/345 |

* cited by examiner

*Primary Examiner* — Anthony J Daniels
(74) *Attorney, Agent, or Firm* — Morris Manning & Martin LLP; Tim Tingkang Xia, Esq.

(57) ABSTRACT

A sharpness processing method and system for a digital image are applied to an image capturing device for capturing a raw image. The method includes the steps. An image processing procedure is performed on the raw image to generate a registered image. A first sharpness enhancement table and a second sharpness enhancement table respectively sharpness attenuation at an outer-edge region and a central region of the registered image are loaded, and a range between the outer-edge region and the central region is defined as a plurality of critical regions. A sharpness enhancement weight table is loaded, and weight values of each critical region respectively corresponding to the first sharpness enhancement table and the second sharpness enhancement table are searched, for obtaining a sharpness enhanced value of each critical region. An image sharpness processing procedure is performed on the critical region, for correct the registered image into a digital image.

13 Claims, 8 Drawing Sheets

SHARPNESS PROCESSING METHOD AND SYSTEM FOR DIGITAL IMAGE

CROSS-REFERENCE TO RELATED APPLICATIONS

This non-provisional application claims priority under 35 U.S.C. §119(a) on Patent Application No(s). 098120315 filed in Taiwan, R.O.C. on Jun. 17, 2009, the entire contents of which are hereby incorporated by reference.

BACKGROUND OF THE INVENTION

1. Field of the Invention

The present invention relates to a method and a system for processing a digital image, and more particularly to a sharpness processing method and system for an image captured by an image capturing device.

2. Related Art

Sharpness is an important term in the photography field, and is one of the indexes widely applied to evaluate the image quality. For the human eyes, in brief, sharpness indicates whether the human eyes can clearly perceive the contour of an object, that is, whether the human eyes can clearly recognize the contour of an object under the recognition capability of the human eyes.

Generally, due to the limitations of an optical imaging system, sharpness attenuation of an imaging outer-edge region is particularly serious. For a digital image, in order to compensate the sharpness loss during an optical imaging process, it is absolutely necessary to perform sharpness processing on the image. Basically, for the principle of performing sharpness processing by using software, the contour of an object is searched for, and the lines of the contour are darkened, so that the contrast becomes stronger, and the perception of the human eyes is sharpened. If it is inappropriately processed, white (black) margins may be easily generated on the edges of the image.

According to a conventional sharpness technique, sharpness processing with uniform strength is performed on a digital image, and the sharpness difference produced by raw optical imaging between an outer-edge and a central region of the image is neglected. Therefore, during the sharpness processing, in order to improve the sharpness of the outer-edge region, abnormal white (black) margins are usually generated on the edges of the central region of the image. On the contrary, if the sharpness processing is performed without causing the abnormal white (black) margins, the sharpness of the outer-edge region of the image is not enough.

SUMMARY OF THE INVENTION

Accordingly, the present invention is directed to a sharpness processing method and system for a digital image, capable of performing sharpness processing on a digital image, and preventing white (black) margins from being generated on the edges of the image after the sharpness processing is performed on the digital image.

In order to achieve the above objectives, in an embodiment of the present invention, a sharpness processing method for a digital image is provided. The method comprises the following steps. A raw image is loaded. An image processing procedure is performed on the raw image to generate a registered image. A first sharpness enhancement table is loaded, which comprises enhanced values of sharpness attenuation at an outer-edge region of the registered image. A second sharpness enhancement table is loaded, which comprises enhanced values of sharpness attenuation at a central region of the registered image, and a range between the outer-edge region and the central region is defined as a plurality of critical regions. A sharpness enhancement weight table is loaded, sharpness enhancement weight values of each critical region respectively corresponding to the first sharpness enhancement table and the second sharpness enhancement table are searched according to the sharpness attenuation distribution of each critical region so as to perform a sharpness interpolation procedure, and a sharpness enhanced value of each critical region is obtained after an interpolation calculation is performed on the critical regions. A differential image sharpness processing procedure is respectively performed on the corresponding critical region by using the sharpness enhanced values, so as to output a digital image after the sharpness processing.

A sharpness processing system for a digital image is also provided. The system comprises an image capturing module, an image processing module, a sharpness enhancement database, a calculating unit, and a central processing unit (CPU). The image capturing module is used for capturing a raw image. The image processing module is used for processing the raw image into a registered image. The sharpness enhancement database comprises a first sharpness enhancement table, a second sharpness enhancement table, and a sharpness enhancement weight table. The first sharpness enhancement table comprises sharpness attenuation enhanced values of an outer-edge region of the registered image, the second sharpness enhancement table comprises sharpness attenuation enhanced values of a central region of the registered image, and the sharpness enhancement weight table records sharpness enhancement weight values of each critical region respectively corresponding to the first sharpness enhancement table and the second sharpness enhancement table. For the calculating unit, the sharpness enhancement database inputs the sharpness enhancement weight table of each critical region respectively corresponding to the first sharpness enhancement table and the second sharpness enhancement table, and the calculating unit calculates a sharpness enhanced value of each critical region according to the first sharpness enhancement table, the second sharpness enhancement table, and the sharpness enhancement weight values respectively corresponding to each critical region. The CPU is electrically connected to the image capturing module, the image processing module, the sharpness enhancement database, and the calculating unit, and used for driving functions thereof, and performing a differential image sharpness processing procedure on the corresponding critical region by using the calculated sharpness enhanced values, so as to correct the registered image into a digital image and output the digital image.

By using the sharpness processing method and system for a digital image of the present invention, image sharpness loss occurred during the optical element imaging is alleviated, and corresponding sharpness enhancement is performed on different imaging regions. Thereby, white (black) margins generated by performing sharpness processing with uniform strength on a digital image are avoided.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The method and system of the present invention may be applied to electronic devices with image processing capability, for example, a personal computer, a digital camera, or a digital photo frame. However, it should be noted that the present invention is not limited herein.

Figure 1:
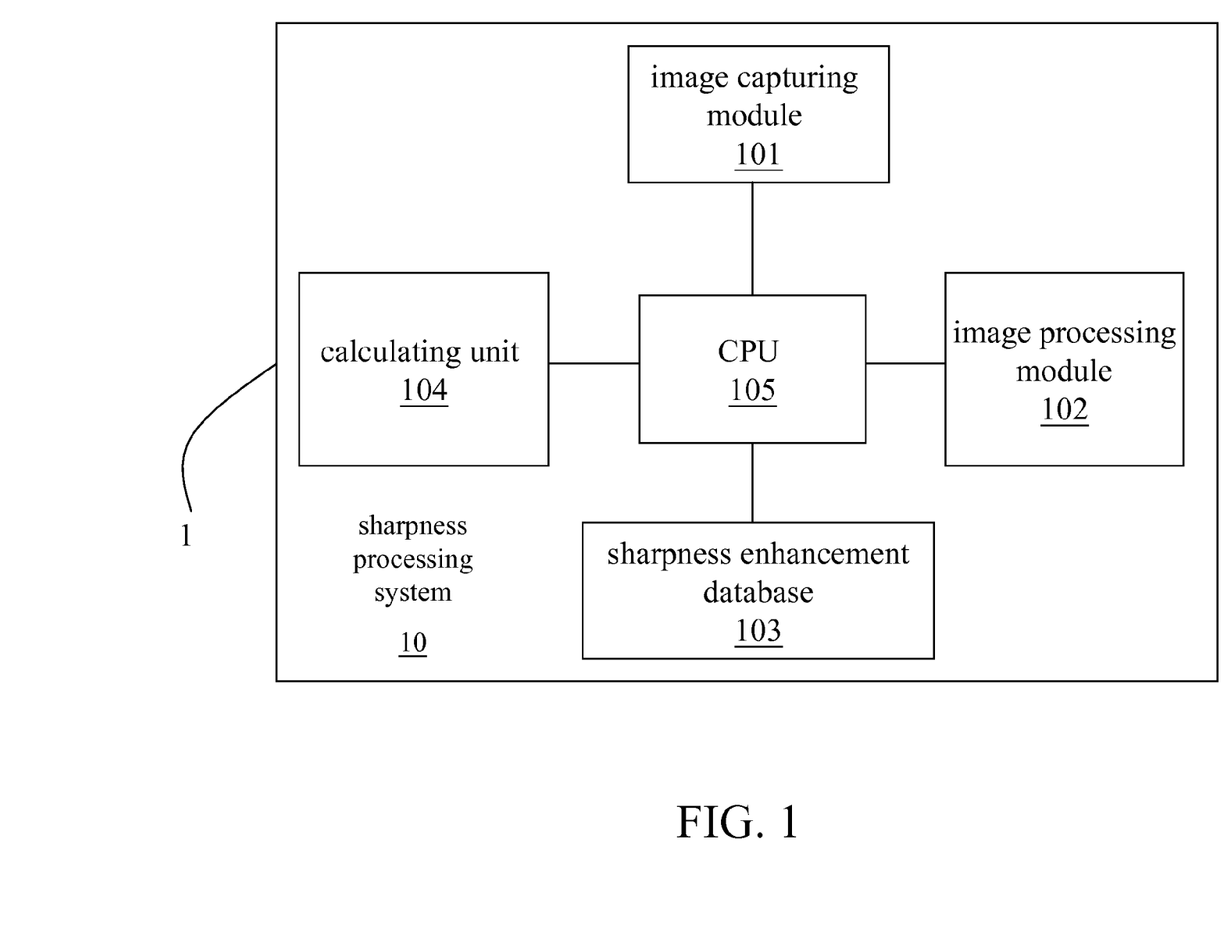
FIG. 1 is a schematic block diagram of a system according to the present invention.

FIG. 1 is a schematic functional block diagram of a system according to the present invention. Referring to FIG. 1, the sharpness processing system for a digital image 10 provided by the present invention comprises an image capturing module 101, an image processing module 102, a sharpness enhancement database 103, a calculating unit 104, and a CPU 105. The CPU 105 is electrically connected to the image capturing module 101, the image processing module 102, the sharpness enhancement database 103, and the calculating unit 104. The sharpness processing system for a digital image 10 provided by the present invention may be disposed in an image capturing device 1, for example, a digital camera.

Figure 2A:
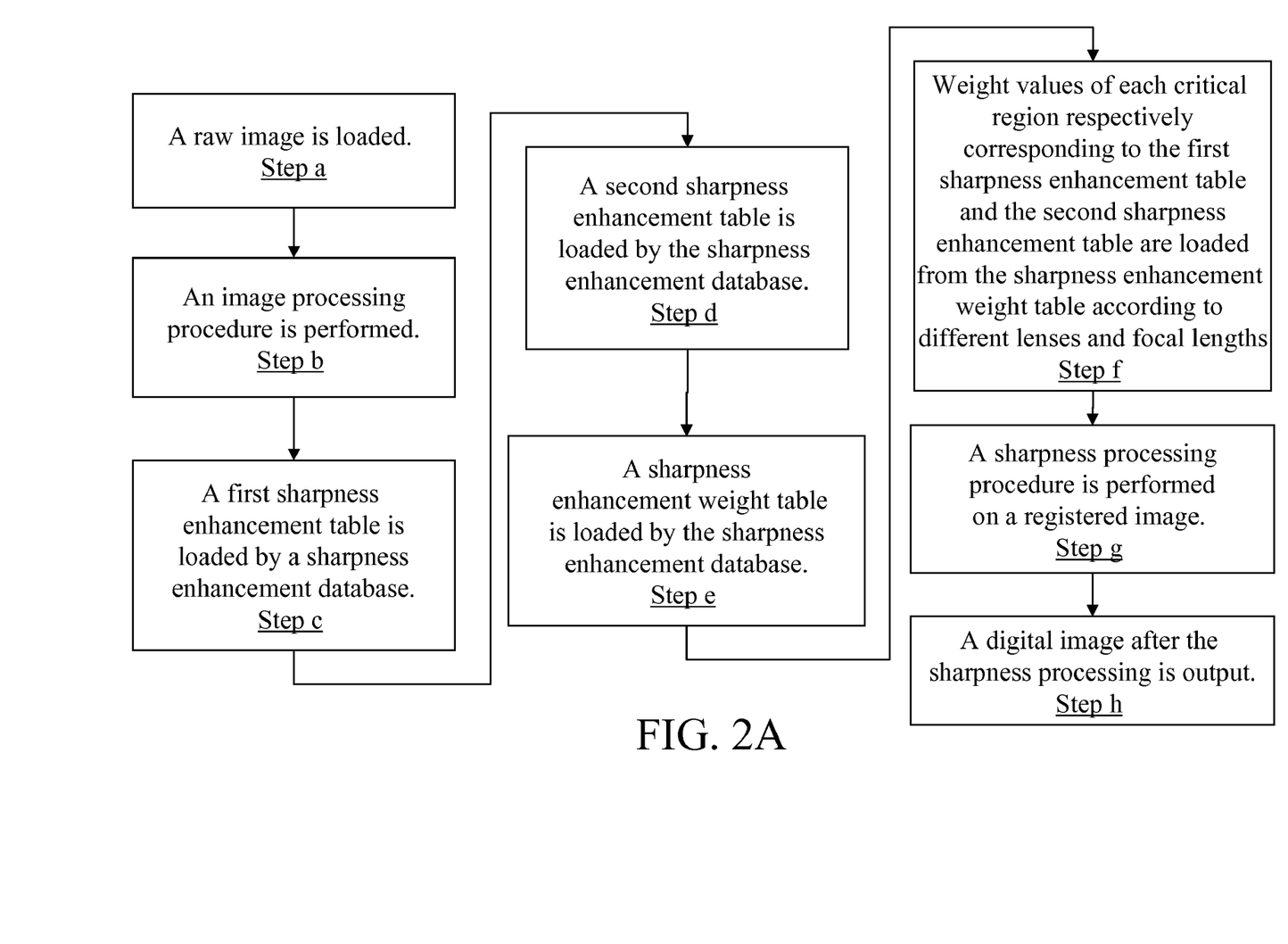
FIGS. 2A to 2C are schematic views of an operation flow according to the present invention.

FIG. 2A shows a specific implementation aspect of a sharpness processing method for a digital image according to the present invention. Referring to FIG. 2A, the method comprises the following steps.

In Step a, a raw image is loaded. It is better that the raw image is image data without being processed, for example, a raw image captured by the image capturing module 101.

In Step b, an image processing procedure is performed. The image processing module 102 is used to perform image processing on the raw image, so as to generate a registered image. The registered image comprises a brightness image, a blue chroma image, and a red chroma image. After that, other digital image processing procedures are performed.

In Step c, a first sharpness enhancement table is loaded by the sharpness enhancement database 103. The first sharpness enhancement table comprises sharpness attenuation enhanced values of an outer-edge region of the registered image, and records different sharpness corner enhanced values ($EV_{corner}$) according to different lenses and focal lengths.

In Step d, a second sharpness enhancement table is loaded by the sharpness enhancement database 103. The second sharpness enhancement table comprises sharpness attenuation enhanced values of a central region of the registered image, and records different sharpness central enhanced values ($EV_{central}$) according to different lenses and focal lengths. A range between the outer-edge region and the central region is defined as a plurality of critical regions 240.

In Step e, a sharpness enhancement weight table is loaded by the sharpness enhancement database 103. The sharpness enhancement weight table comprises sharpness enhancement weight values of each critical region 240 respectively corresponding to the first sharpness enhancement table and the second sharpness enhancement table.

In Step f, the weight values of each critical region 240 respectively corresponding to the first sharpness enhancement table and the second sharpness enhancement table are loaded from the sharpness enhancement weight table according to different lenses and focal lengths.

In Step g, a sharpness processing procedure is performed on the registered image. The calculating unit 104 is used to perform the sharpness processing procedure on the registered image, and calculate the sharpness enhanced value of each critical region 240.

In Step h, a digital image after the sharpness processing is output.

All the above steps are driven by the CPU 105. It should be noted that, the sequence of Steps c to f is set for ease of illustration, and is not strictly limited thereto. Generally, when the sharpness enhancement database 103 is loaded, the first sharpness enhancement table, the second sharpness enhancement table, and the sharpness enhancement weight table may also be loaded at the same time, and the critical regions 240 can be defined after the CPU recognizes the central region and the outer-edge region.

Figure 2B:
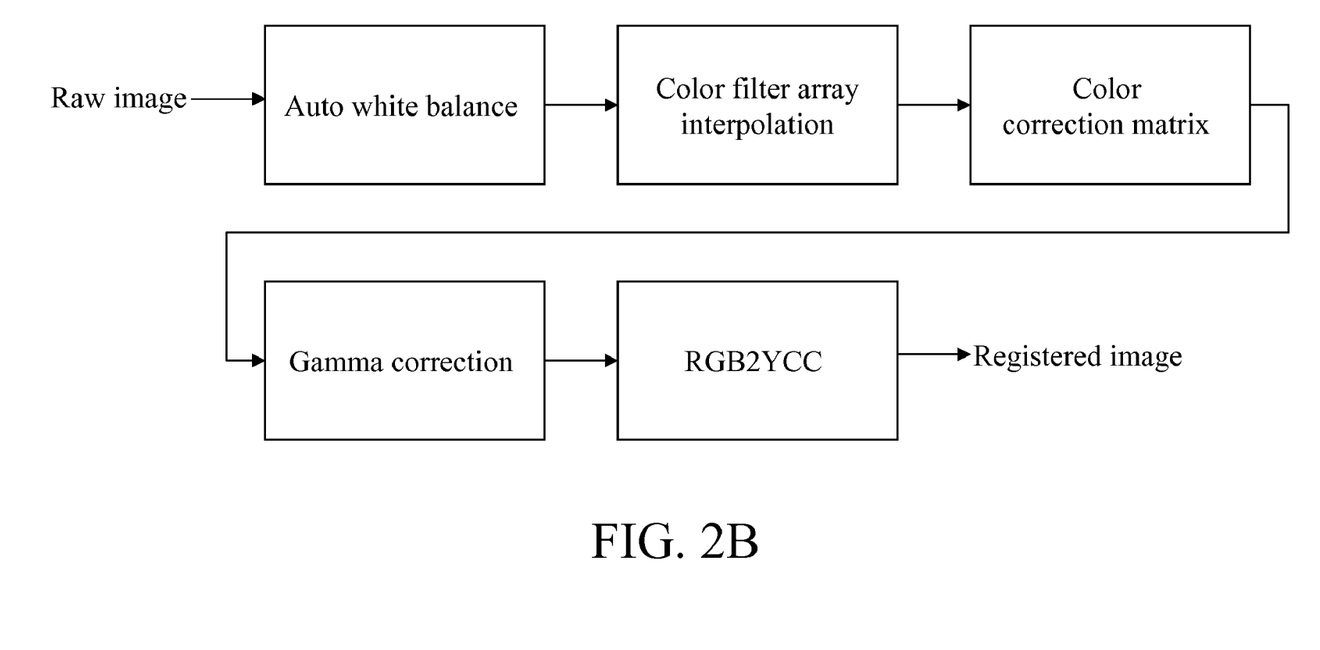

Referring to FIG. 2B, a preferred embodiment of the image processing procedure in Step b comprises the following steps. An image auto white balance procedure, a color filter array interpolation procedure, a color correction matrix procedure, a gamma correction procedure, and a color gamut transformation procedure (RGB2YCC) are respectively performed on the raw image, and the sharpness processing procedure is performed on the image after all the above image processing procedures. In addition, these image processing procedures all belong to the conventional art and are not the key point of the present invention, so the detailed descriptions thereof will not be given herein again.

Figure 2C:
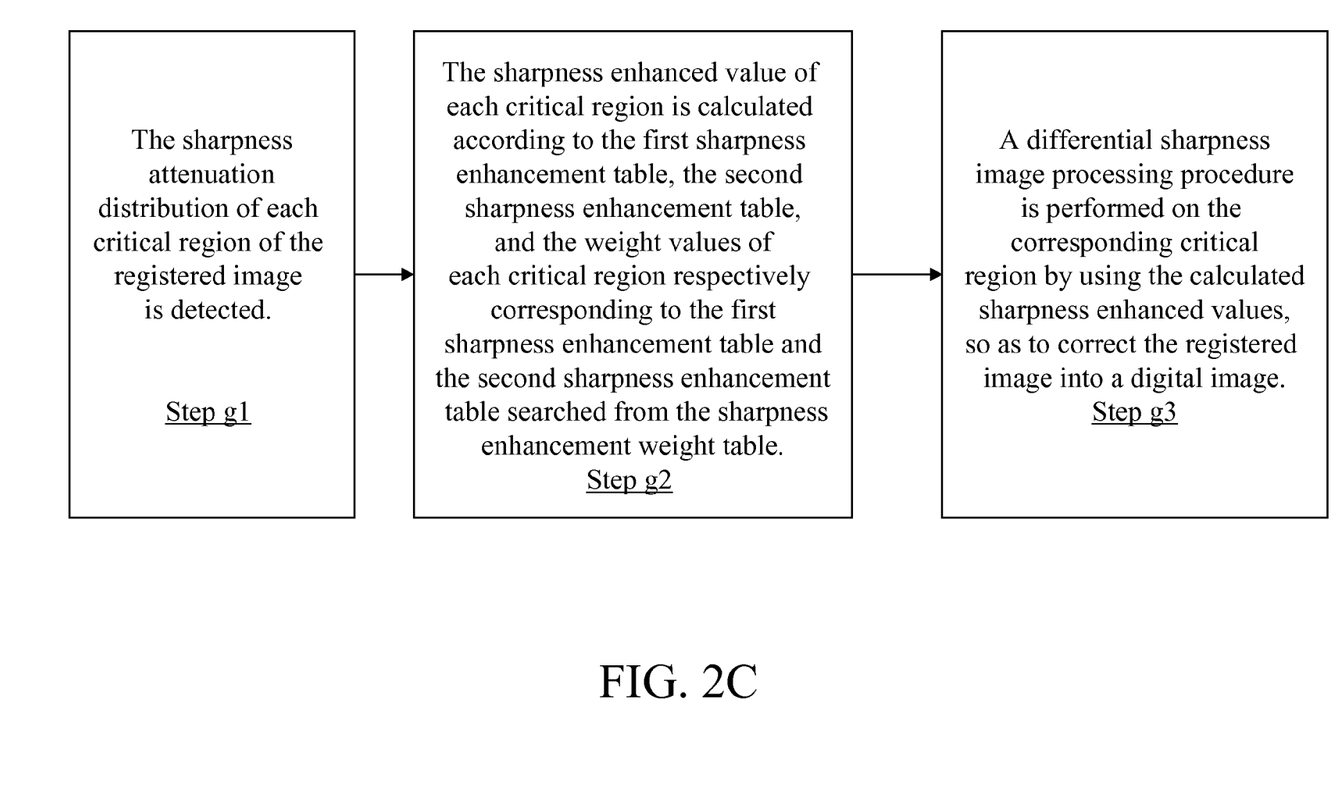

Referring to FIG. 2C, a preferred embodiment of the sharpness processing procedure in Step g comprises the following steps.

In g1, the sharpness attenuation distribution of each critical region 240 on the registered image is detected.

In g2, the sharpness enhanced value of each critical region 240 is calculated according to the first sharpness enhancement table, the second sharpness enhancement table, and the weight values of each critical region 240 respectively corresponding to the first sharpness enhancement table and the second sharpness enhancement table searched from the sharpness enhancement weight table.

In g3, a differential sharpness image processing procedure is performed on the corresponding critical region 240 by using the calculated sharpness enhanced value, so as to correct the registered image into a digital image.

Figure 3A:
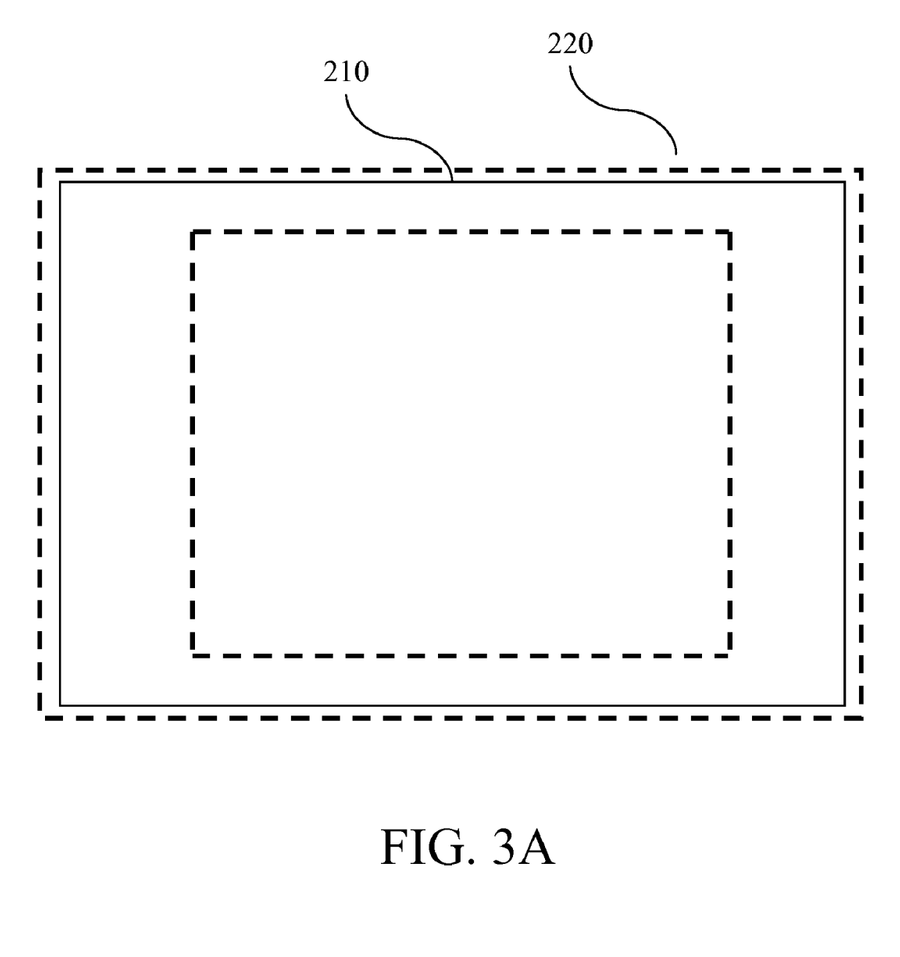
FIG. 3A is a schematic view of an outer-edge region of a registered image according to the present invention.
Figure 3B:
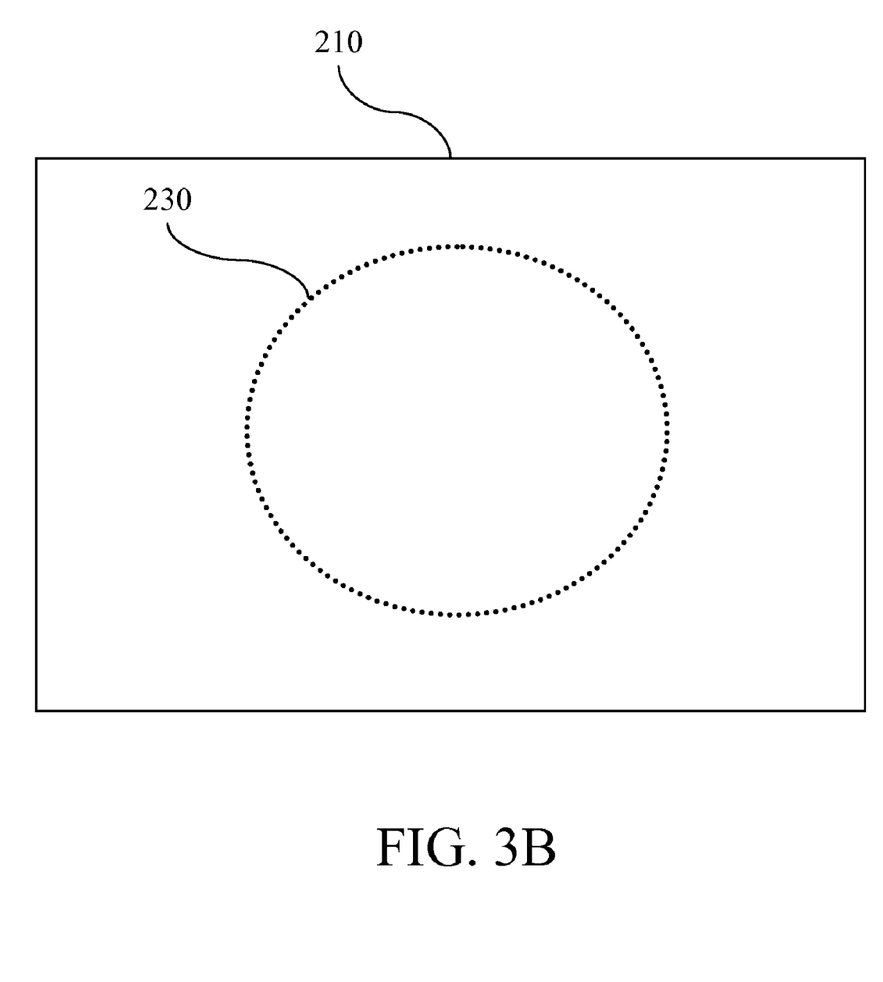
FIG. 3B is a schematic view of a central region of the registered image according to the present invention.
Figure 3C:
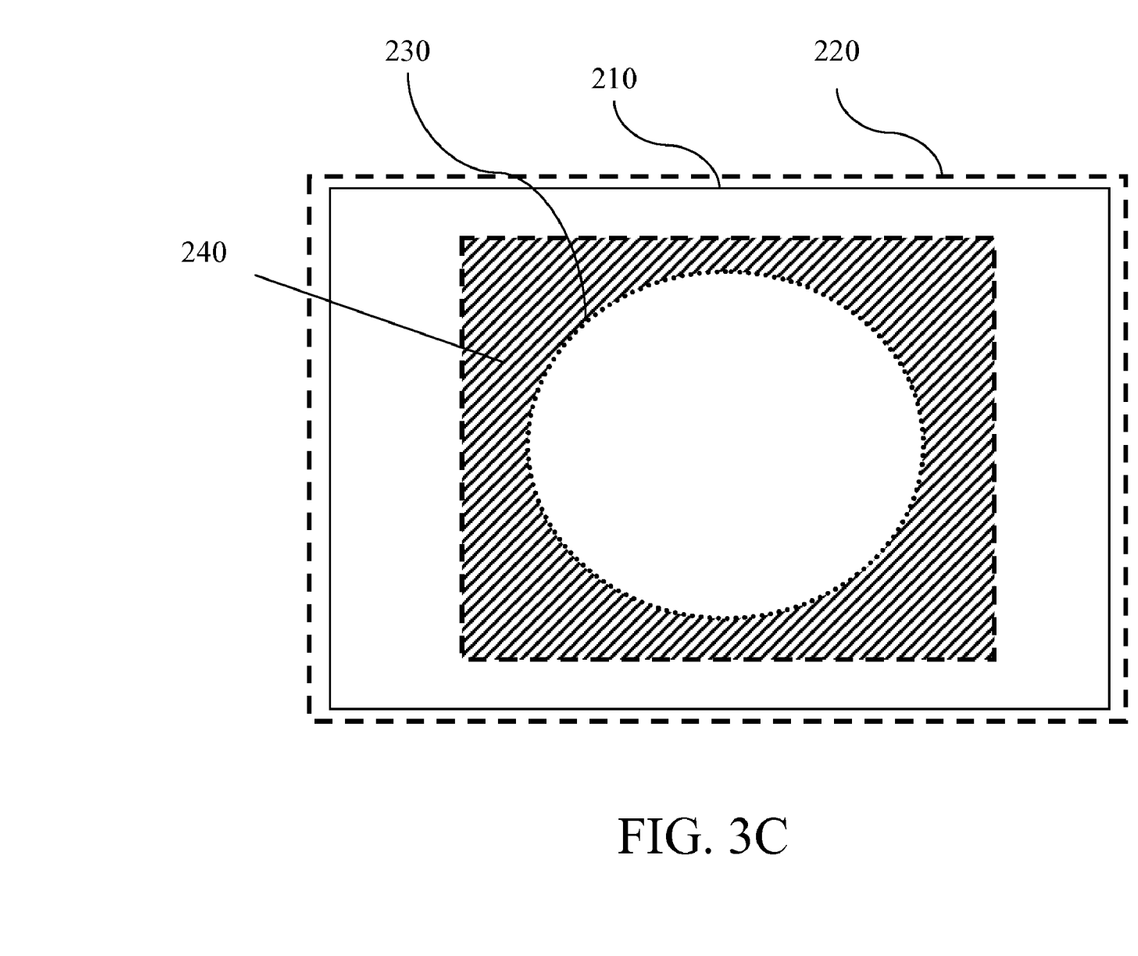
FIG. 3C is a schematic view of critical regions of the registered image according to the present invention.

FIGS. 3A to 3C are respectively schematic views of the outer-edge region and the central region of the registered image. Referring to FIGS. 3A to 3C, the first sharpness enhancement table and the second sharpness enhancement table with different weights are respectively loaded from the sharpness enhancement weight table of the sharpness enhancement database 103 according to different regions of the registered image 210. Due to the limitations of optical element imaging, the sharpness attenuation of the outer-edge region 220 on the registered image 210 is particularly serious. On the contrary, the sharpness attenuation of the central region 230 on the registered image 210 is much smaller than that of the outer-edge region 220. Therefore, in the present invention, the sharpness enhanced value in the first sharpness enhancement table is greater than the sharpness enhanced value in the second sharpness enhancement table. Further, the weight value of each critical region 240 corresponding to the outer-edge region 220 in the sharpness enhancement weight table is gradually increased from the central region to the outer-edge region.

For ease of illustration, in the present invention, the range between the central region 230 and the outer-edge region 220 is defined as the plurality of critical regions 240.
Referring to Formula 1 as follows, it is a specific implementation of calculating the sharpness enhanced value of the critical region 240 according to the present invention.

$$\begin{aligned}
\text{Enhanced Value} &= \frac{EV_{central} \times W_{central} + EV_{corner} \times W_{corner}}{W_{central} + W_{corner}} \quad \text{(Formula 1)} \\
&= \frac{EV_{central} \times (W_{norm} - W_{corner}) + EV_{corner} \times W_{corner}}{W_{norm}} \\
&= \frac{(EV_{corner} - EV_{central}) \times W_{corner} + EV_{central} \times W_{norm}}{W_{norm}}
\end{aligned}$$

$EV_{central}$ is an enhanced value of the central region of the registered image, and is acquired from the second sharpness enhancement table. $EV_{corner}$ is an enhanced value of the outer-edge region of the registered image, and is acquired from the first sharpness enhancement table. $W_{central}$ is a weight value of the central region searched from the sharpness enhancement weight table. $W_{corner}$ is a weight value of the outer-edge region also searched from the sharpness enhancement weight table. $W_{norm}$ is a total weight value and a constant. Through Formula 1, the sharpness enhanced values of all the regions of the registered image 210 can be obtained.

It should be noted that, although the sharpness enhanced value of each critical region 240 of the registered image is obtained in a linear manner through Formula 1, the present invention is not limited thereto. As long as the sharpness enhanced value of each critical region 240 is calculated by adjusting the weights of the enhanced values of the central region and the outer-edge region on the registered image, which falls within the scope of the present invention.

Figure 4:
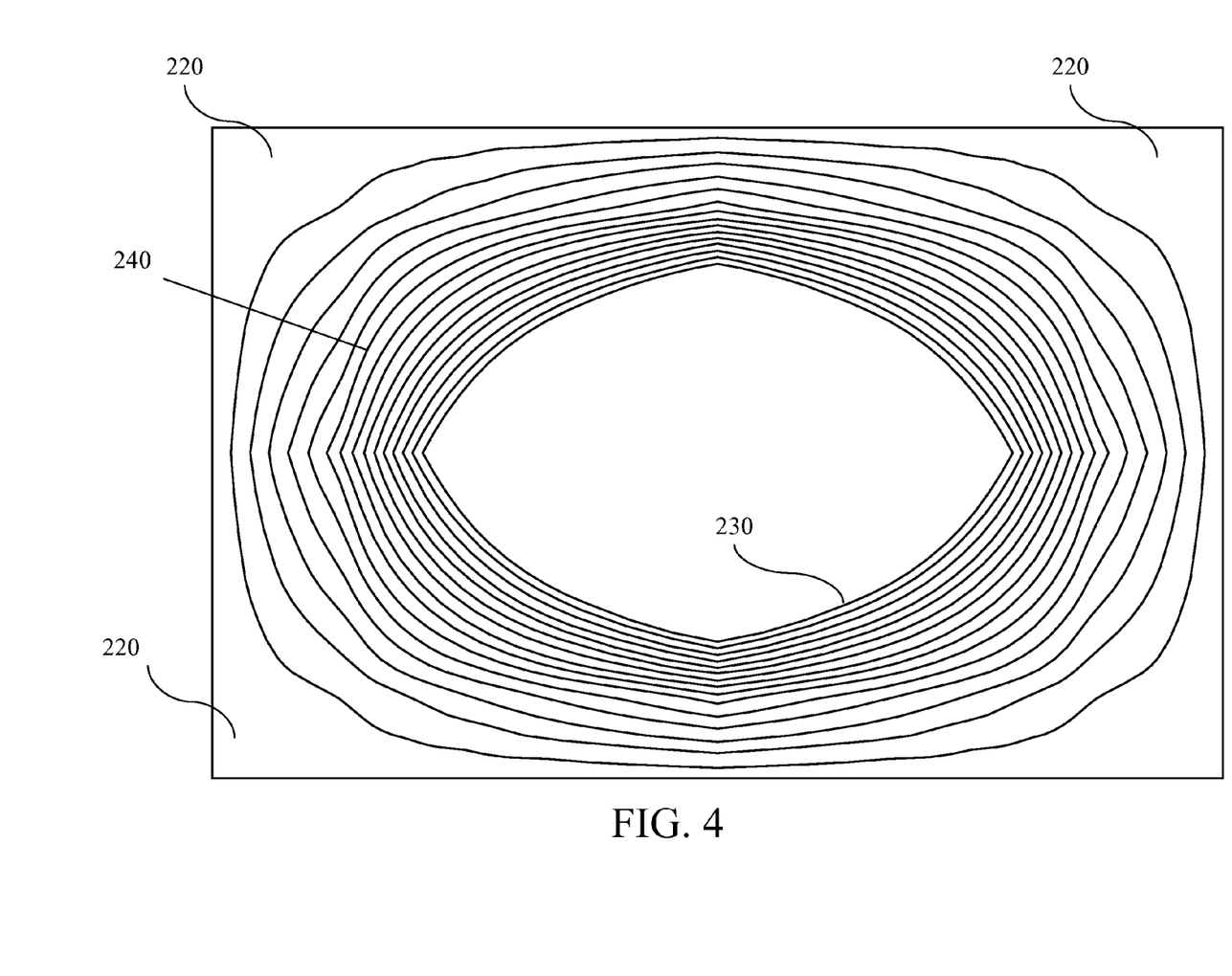
FIG. 4 is a schematic view of the critical regions of the registered image according to the present invention.

FIG. 4 is a distribution diagram of the weight values ($W_{corner}$) of the outer-edge region obtained through Formula 1, $W_{norm}$ ($W_{central}+W_{corner}$) is a fixed value, and the weight values ($W_{corner}$) of the outer-edge region are gradually increased from the center to the edge. Referring to FIG. 4, the sharpness attenuation distribution of each critical region 240 is the registered image, i.e., different sharpness enhancement weight values corresponding to the first sharpness enhancement table and the second sharpness enhancement table are obtained according to lens properties of the image capturing device, for example, a modulation transfer function (MTF) of each critical region 240 is measured according to different focal lengths.

By using the sharpness processing method and system for a digital image according to the present invention, image sharpness loss occurred during the optical element imaging is alleviated, and corresponding sharpness enhancement is performed on different imaging regions and lens properties. During the sharpness enhancement, two sharpness enhancement tables respectively being strong and weak are adopted, a first sharpness enhancement table which is relatively stronger is applied for the region having more serious image attenuation (the outer-edge region of the image), and a second sharpness enhancement table which is relatively weaker is applied for the region having lighter image attenuation (the central region of the image). The sharpness enhanced value of each critical region 240 may be obtained through a linear interpolation formula (Formula 1) after searching for the sharpness enhancement weight value, thereby avoiding white (black) margins generated by performing sharpness processing with a single sharpness coefficient on a digital image.

What is claimed is:

1. A sharpness processing method for a digital image, applied to an image capturing device to capture a raw image, the method comprising:
    loading the raw image;
    performing an image processing procedure on the raw image to generate a registered image;
    loading a first sharpness enhancement table corresponding to sharpness attenuation of an outer-edge region of the registered image;
    loading a second sharpness enhancement table corresponding to sharpness attenuation of a central region of the registered image, and defining a range between the outer-edge region and the central region as a plurality of critical regions; and
    performing a sharpness processing procedure on the registered image by the image capturing device, comprising:
        loading a sharpness enhancement weight table, and searching for sharpness enhancement weight values of each of the critical regions respectively corresponding to the first sharpness enhancement table and the second sharpness enhancement table according to the sharpness attenuation distribution of each of the critical regions of the registered image;
        calculating a sharpness enhanced value of each of the critical regions according to the first sharpness enhancement table, the second sharpness enhancement table, and the sharpness enhancement weight values of each of the critical regions respectively corresponding to the first sharpness enhancement table and the second sharpness enhancement table; and
        respectively performing a differential image sharpness processing procedure on the corresponding critical region by using the calculated sharpness enhanced values, so as to correct the registered image into the digital image and output the digital image.

2. The sharpness processing method for a digital image according to claim 1, wherein the sharpness enhanced value of the critical region at the outer edge of the registered image is greater than the sharpness enhanced value at the central region of the registered image.

3. The sharpness processing method for a digital image according to claim 1, wherein the sharpness enhancement weight values of each of the critical regions respectively corresponding to the first sharpness enhancement table and the second sharpness enhancement table are obtained according to lens properties of the image capturing device.

4. The sharpness processing method for a digital image according to claim 1, wherein the image processing procedure comprises: respectively performing an image auto white balance procedure, a color filter array interpolation procedure, a color correction matrix procedure, a gamma correction procedure, and a color gamut transformation procedure (RGB2YCC) on the raw image by the image capturing device.

5. The sharpness processing method for a digital image according to claim 4, wherein the sharpness processing procedure is performed on the image after other image processing procedures.

6. The sharpness processing method for a digital image according to claim 1, wherein the registered image comprises a brightness image, a blue chroma image, and a red chroma image.

7. The sharpness processing method for a digital image according to claim 6, wherein the sharpness enhanced value (EnhancedValue) of the critical region of the registered image is determined according to the following formula:

$$\begin{aligned} \text{Enhanced Value} &= \frac{EV_{central} \times W_{central} + EV_{corner} \times W_{corner}}{W_{central} + W_{corner}} \\ &= \frac{EV_{central} \times (W_{norm} - W_{corner}) + EV_{corner} \times W_{corner}}{W_{norm}} \\ &= \frac{(EV_{corner} - EV_{central}) \times W_{corner} + EV_{central} \times W_{norm}}{W_{norm}} \end{aligned}$$

$EV_{central}$ is an enhanced value of the central region, $EV_{corner}$ is an enhanced value of the outer-edge region, $W_{central}$ is a weight value of the central region, $W_{corner}$ is a weight value of the outer-edge region, and the $W_{norm}$ is a total weight value.

8. A sharpness processing system for a digital image, comprising:

an image capturing module, for capturing a raw image;

an image processing module, for processing the raw image into a registered image;

a sharpness enhancement database, comprising a first sharpness enhancement table, a second sharpness enhancement table, and a sharpness enhancement weight table, wherein the first sharpness enhancement table comprises sharpness attenuation enhanced values of an outer-edge region of the registered image, the second sharpness enhancement table comprises sharpness attenuation enhanced values of a central region of the registered image, and the sharpness enhancement weight table records sharpness enhancement weight values of each of the critical regions respectively corresponding to the first sharpness enhancement table and the second sharpness enhancement table according to sharpness attenuation of the plurality of critical regions of the registered image between the outer-edge region and the central region;

a calculating unit, wherein the sharpness enhancement database inputs the weight values of each of the critical regions respectively corresponding to the first sharpness enhancement table and the second sharpness enhancement table, and the calculating unit calculates a sharpness enhanced value of each of the critical regions according to the first sharpness enhancement table, the second sharpness enhancement table, and the weight values of each of the critical regions respectively corresponding to the first sharpness enhancement table and the second sharpness enhancement table; and a central processing unit (CPU), electrically connected to the image capturing module, the image processing module, the sharpness enhancement database, and the calculating unit, for driving functions thereof, and performing a differential image sharpness processing procedure on the corresponding critical region by using the calculated sharpness enhanced values, so as to correct the registered image into a digital image and output the digital image.

9. The sharpness processing system for a digital image according to claim 8, wherein the sharpness enhanced value of the critical region at the outer edge of the registered image is greater than the sharpness enhanced value at the central region of the registered image.

10. The sharpness processing system for a digital image according to claim 8, applied to an image capturing device, wherein the sharpness enhancement weight values of each of the critical regions respectively corresponding to the first sharpness enhancement table and the second sharpness enhancement table are obtained according to lens properties of the image capturing device.

11. The sharpness processing system for a digital image according to claim 8, wherein the image processing module respectively performs an image auto white balance procedure, a color filter array interpolation procedure, a color correction matrix procedure, a gamma correction procedure, and a color gamut transformation procedure (RGB2YCC) on the raw image, so as to obtain the registered image.

12. The sharpness processing system for a digital image according to claim 8, wherein the registered image comprises a brightness image, a blue chroma image, and a red chroma image.

13. The sharpness processing system for a digital image according to claim 12, wherein the sharpness enhanced value (EnhancedValue) of the critical region of the registered image is determined according to the following formula:

$$\begin{aligned} \text{Enhanced Value} &= \frac{EV_{central} \times W_{central} + EV_{corner} \times W_{corner}}{W_{central} + W_{corner}} \\ &= \frac{EV_{central} \times (W_{norm} - W_{corner}) + EV_{corner} \times W_{corner}}{W_{norm}} \\ &= \frac{(EV_{corner} - EV_{central}) \times W_{corner} + EV_{central} \times W_{norm}}{W_{norm}} \end{aligned}$$

$EV_{central}$ is an enhanced value of the central region, $EV_{corner}$ is an enhanced value of the outer-edge region, $W_{central}$ is a weight value of the central region, $W_{corner}$ is a weight value of the outer-edge region, and the $W_{norm}$ is a total weight value.

* * * * *